United States Patent [19]

Ude et al.

[11] Patent Number: 4,745,225
[45] Date of Patent: May 17, 1988

[54] PHOSPHORUS-CONTAINING POLYARYLENE ETHERS

[75] Inventors: Werner Ude; Joachim Knebel, both of Darmstadt, Fed. Rep. of Germany

[73] Assignee: Röhm GmbH, Darmstadt, Fed. Rep. of Germany

[21] Appl. No.: 870,369

[22] Filed: Jun. 4, 1986

[30] Foreign Application Priority Data

Jun. 13, 1985 [DE] Fed. Rep. of Germany ....... 3521123

[51] Int. Cl.$^4$ ............................................... C07F 9/02
[52] U.S. Cl. ....................................... 568/15; 568/12; 568/14
[58] Field of Search ............................ 568/12, 14, 15

[56] References Cited

U.S. PATENT DOCUMENTS

| | | | |
|---|---|---|---|
| 3,784,504 | 1/1974 | Feasey | 260/37 N |
| 3,888,930 | 6/1975 | Kleiner et al. | 568/15 |
| 3,960,815 | 6/1976 | Darsow et al. | 260/49 |
| 3,975,447 | 8/1976 | Knoth, Jr. et al. | 568/14 |
| 4,064,104 | 12/1977 | Mrowca | 568/15 X |
| 4,072,653 | 2/1978 | Moedritzer | 568/14 X |
| 4,087,408 | 5/1978 | Moedritzer | 568/15 X |
| 4,175,175 | 11/1979 | Johnson et al. | 528/125 |
| 4,429,161 | 1/1984 | Abatjoglow et al. | 568/14 |
| 4,447,584 | 5/1984 | Bergeret et al. | 568/14 X |
| 4,492,805 | 1/1985 | Besecke et al. | 568/012 |

FOREIGN PATENT DOCUMENTS

| | | |
|---|---|---|
| 85377 | 8/1983 | European Pat. Off. |
| 143407 | 6/1985 | European Pat. Off. |
| 2305413 | 8/1974 | Fed. Rep. of Germany |

OTHER PUBLICATIONS

Hashimoto, Journal of Macromol. Sci. Chem., A11 (12), pp. 2167–2176 (1977).
Chem. Abstr. 88, 121744w (1978).

*Primary Examiner*—Paul F. Shaver
*Attorney, Agent, or Firm*—Curtis, Morris & Safford

[57] ABSTRACT

Branched phosphorus-containing polyarylene ethers comprising repeating units of the structure

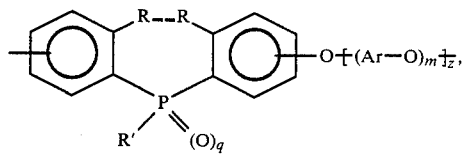

wherein
q and z are 0 or 1; and
m has an average value from 1 to 10, statistically alternating with branching points units of the structures

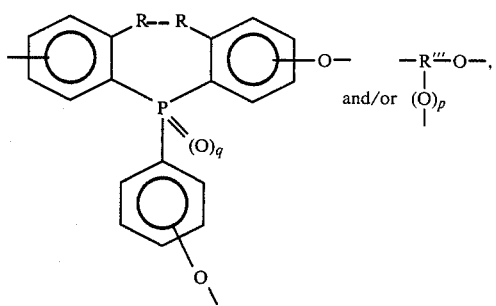

p being an integer from 1 to 4, and methods for making such ethers by polycondensing appropriate aromatic bifunctional compounds in the presence of further condensable compounds having more than two reactive groups.

16 Claims, No Drawings

PHOSPHORUS-CONTAINING POLYARYLENE ETHERS

FIELD OF THE INVENTION

The present invention relates to phosphorus-containing polyarylene ethers which form masses that are resistant to high temperatures, are difficultly combustible, and have resin properties, and to methods for their preparation.

THE PRIOR ART

German patent publication No. 32 03 186 teaches linear phosphorus-containing polyarylene ethers which differ from the phosphorus-containing aromatic polyethers described by S. Hashimoto et al., Journal of Macromol. Sci. Chem., A 11 (12), pp. 2167–2176 (1977), in having a higher reduced viscosity, in other words a higher molecular weight, and in forming masses of considerable strength and typical resin properties with good self-extinguishing characteristics. Their reduced viscosity is at least 0.25 dl/g.

Phosphorus-containing polyarylene ethers are prepared by the polycondensation of, for example, aromatic bisfluorides with bisphenols, at least one of these components having a phosphine or phosphine oxide partial structure. A drawback in the preparation of such substances having resin properties is that their formation fundamentally requires the use of very pure bifunctional starting materials to obtain linear macromolecules. When cheaper but less reactive starting compounds are used, very long reaction times ranging from 10 to 80 hours will be necessary. To obtain shorter reaction times, high-priced, more reactive, starting compounds will have to be used.

THE OBJECT AND THE INVENTION

The invention thus has as its object to provide phosphorus-containing polyarylene ethers which are resistant to high temperatures, are difficultly combustible, and have genuine resin properties but which can be prepared in relatively short reaction times from lower-cost and, if need be, less pure starting materials. This object is realized by phosphorus-containing polyarylene ethers having repeating units of the formula

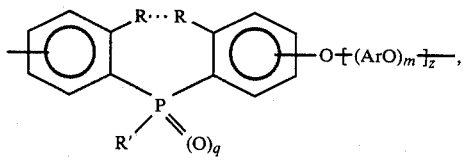

wherein
R, taken alone, is hydrogen,
R . . . R, taken together, are the same as R″ below,
R′ is alkyl, chloromethyl, or aryl,
Ar is phenylene, naphthalene, or

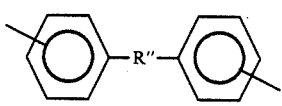

R″ is a covalent single bond, oxygen, sulfur, a sulfonyl, carbonyl, methylene, or isopropylidene bridging group, or an organic group having from 5 to 15 carbon atoms whose free valences emanate from quaternary carbon atoms,
q is 0 or 1,
m has an average value from 1 to 10, and
z is 0 or 1,
wherein the said ether is branched and contains as branching points units of the formulas

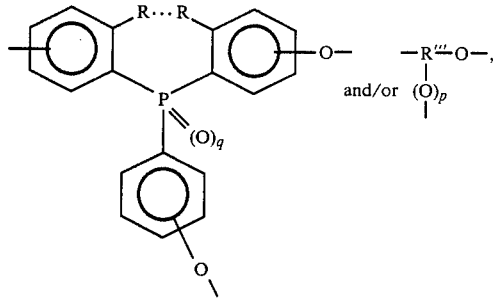

which statistically alternate with units of the earlier formula and wherein R‴ is an at least trivalent aliphatic or aromatic group, p is an integer from 1 to 4, and R and q have their earlier meaning.

In the following discussion, units of the formula

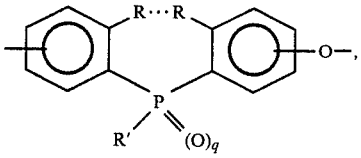

will, for convenience, be identified as units "A"; units of the formula

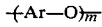

will be referred to as units "B"; structures of the formula

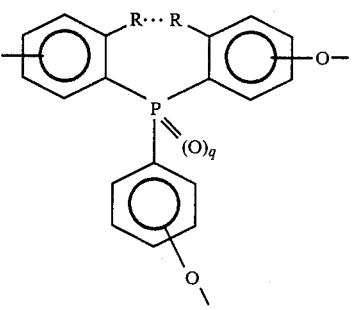

will be named units "C"; and units having the formula

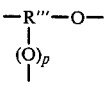

will be called "D".

These units are respectively derived from compounds A', B', C', and D' having the following structures, wherein X is halogen, eg. F or Cl, or hydroxy:

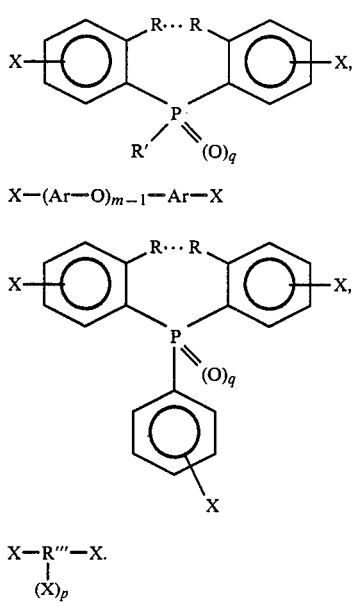

$$X-(Ar-O)_{m-1}-Ar-X \quad B'$$

$$X-R'''-X. \quad D'$$
$$\underset{(X)_p}{|}$$

The compounds of the invention differ from the compounds described in German patent publication No. 32 03 186 in that they have a branched molecular structure. Surprisingly, they form masses that are not crosslinked and which have the good properties which the previously described polyarylene ethers are known to possess.

ADVANTAGES OF THE INVENTION

By the incorporation, in amounts of from 2 to 20 mole percent, of compounds having more than two functional groups capable of polycondensation, the reaction times required up to now for the formation of phosphorus-containing polyethers having the required properties are reduced drastically, that is to about one-twentieth of the reaction times previously necessary. This commercially very significant acceleration of the reaction, the causes of which are not known but which may be connected with branching during the polycondensation reaction, can be achieved also when less reactive and, if need be, impure starting compounds are used in the preparation of the phosphorus-containing polyarylene ethers. For example, instead of using 4,4'-difluorotriphenylphosphine oxide, a high priced compound, as one of the principal monomers in the preparation of the polyarylene ethers of the invention, the lower cost analogous dichloro derivative may be used. Also, the sodium chloride then obtained as a byproduct in the polycondensation is easier to dispose of than the byproduct sodium fluoride.

STRUCTURE OF THE NEW POLYARYLENE ETHERS

The new phosphorus-containing polyarylene ethers are formed by the condensation of a mixture of bi- and higher-functional starting compounds. Nevertheless, and surprisingly, no appreciable amounts of crosslinked polymers are obtained when the amount of polyfunctional starting substances is properly limited. The polymers are soluble and fusible, which they would not be if they were completely crosslinked, and should thus be regarded as at least partially branched. However, there are indications that only some of the polyfunctional starting compounds take part in the polycondensation with more than two functions, so that the number of the units formed from them does not correspond to the actual degree of branching. Because of the higher functionality actually present, these will here be referred to simply as "branching monomers" or "branching units".

The number of branching units is empirically set so high that the desired acceleration of the polycondensation to polymers with resin properties occurs, but solubility and fusibility are preserved. When the content of branching units is too low, resin-like polycondensates are formed only after very long reaction times. When it is too high, insoluble and infusible polycondensates are ultimately obtained. The risk of crosslinking can be reduced by the addition of monofunctional starting substances E—X, where X represents a reactive group capable of condensation, and E is a monofunctional group, and in particular is a hydrocarbon group such as an alkyl or aryl group, or is a triphenylphosphine oxide group. These monofunctional groups then form end groups on the main and side chains and prevent their condensation, which would result in crosslinking. When such monofunctional compounds are present, they are suitably employed in an amount from 0.1 to 15 mol percent of the number of moles of bis-halide compounds (or bis-phenol compounds) involved in the reaction.

The sum of all functional OH plus halogen groups in the linear chain shall be defined as a mounting to 200%, 15% of which shall belong to molecules with more than 2 halogen and/or hydroxy functions at the maximum.

Conversely, the use of tri- or higher-functional starting compounds makes it possible to use bifunctional starting substances containing minor amounts of monofunctional compounds as impurities resulting from their preparation. In the absence of the higher functional starting substances, these monofunctional impurities would have a chain terminating effect and limit the molecular weight to an undesirably low level.

In the preferred polyarylene ethers of the invention containing branching units C and D, A and B units alternate in the linear molecule segments. From this the following preferred schematic structures result for the branched polymer molecules:

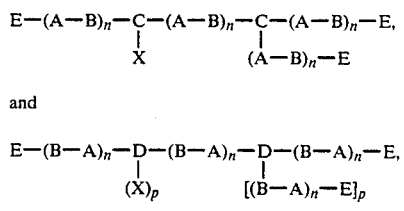

and $$E-(B-A)_n-D-(B-A)_n-D-(B-A)_n-E,$$
$$\underset{(X)_p}{|} \quad \underset{[(B-A)_n-E]_p}{|}$$

wherein the indices n signify the same or different integers. The schematic structures differ from the actual molecular structures in that the main chain may contain more than two branching units C or D and that the side chains in turn may exhibit single or multiple branching. Moreover, when tetra- or higher-functional monomers, D, are used, additional variants will result upon merely partial reaction of their reactive groups X. The possibility that both C and D branching types may be present in the same polymer molecule has not been represented here, either. The preferred amount of the branching units C or D ranges from 0.5 to 10 mole percent of the sum of the moles of units separated by ether oxygen atoms. The proportion of the end group units E may be of the same order of magnitude. The reduced viscosity of the phosphorus-containing polyarylene ether is preferably at least 0.25 dl/g.

PREPARATION OF THE POLYARYLENE ETHERS

It has been found that by the polycondensation of bifunctional compounds of the structure A', alone or with bifunctional compounds of the structure B+, in the presence of the higher than bifunctional compounds C' or D', branched, uncrosslinked phosphorus-containing polyarylene ethers possessing the required resin properties are formed in surprisingly short reaction times.

The polycondensation conditions to be employed in the preparation of the new polyarylene ethers are comparable with those used in the preparation of phosphorus-containing polyarylene ethers according to German patent publication No. 32 03 186 or U.S. Pat. No. 4,492,805. This is true espcially of the use of appropriate solvents, for example, chlorobenzene or N-methylpyrrolidone, the reaction temperature of from 100° C. to 300° C., and the condensing agents, for which strongly basic alkali compounds, and particularly sodium carbonate or potassium carbonate, are used in an amount equivalent to the amount of halide to be cleaved.

The compounds A', B', C', and D' are used in such ratios to one another that the halogen groups, and in particular the F and/or Cl and OH groups, reacting with one another are equivalent, optionally with the condition that the higher than bifunctional compound C' or D' be regarded as compounds having only two reactive groups. Under the conditions stated, reaction time ranging from 30 minutes to several hours will be required to prepare the polymers.

THE STARTING COMPOUNDS

Among the phosphorus-containing starting compounds of the structure A', compounds of methyldiphenylphosphine, and particularly of triphenylphosphine, and here generally derivatives of triphenylphosphine oxide, are preferred. The groups X, and particularly the F and/or Cl atoms, are preferably in the para position to the carbon atoms attached to the phosphorus atom. The preferred representatives of the compound A' are 4,4'-dichlorotriphenylphosphine oxide, 4,4'-dichlorodiphenylmethylphosphine oxide, 4,4'-difluorotriphenylphosphine oxide, and 4,4'-difluorodiphenylmethylphosphine oxide.

Typical examples of the bifunctional aromatic compounds B' have the following structures (1) to (8):

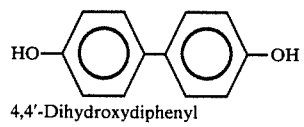

4,4'-Dihydroxydiphenyl (1)

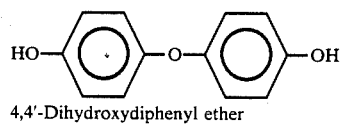

4,4'-Dihydroxydiphenyl ether (2)

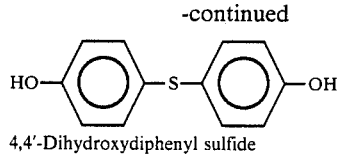

4,4'-Dihydroxydiphenyl sulfide (3)

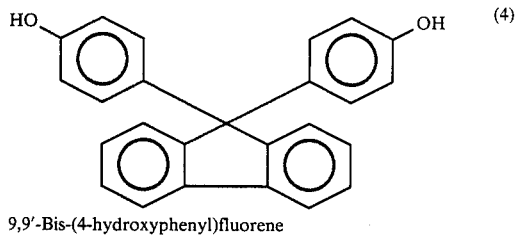

9,9'-Bis-(4-hydroxyphenyl)fluorene (4)

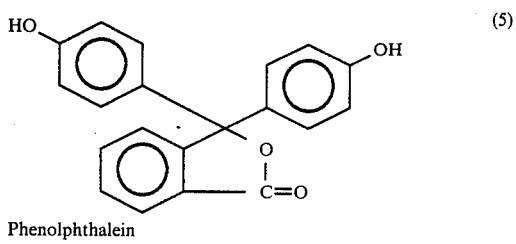

Phenolphthalein (5)

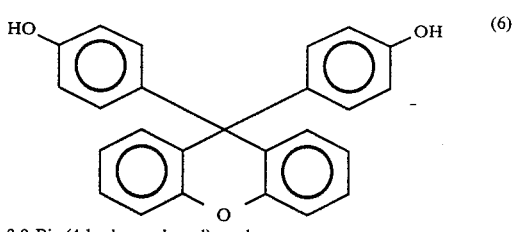

9,9-Bis-(4-hydroxyphenyl)xanthene (6)

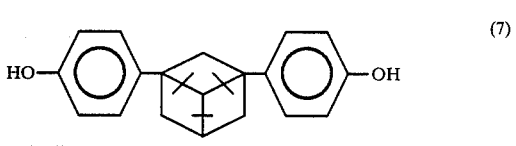

4,4'-Dihydroxyphenyl adamantane (7)

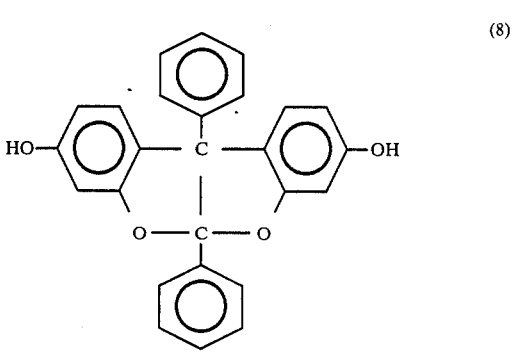

(8)

The invention thus also includes groups R" which are linked by multiple bridges to the phenyl groups attached to the free valences.

The bifunctional aromatic compound B', represented by the formula X—(Ar—O)$_{m-1}$—Ar—X, is preferably used with X=OH. However, the functions X in the molecule may optionally also be halogen, and particularly fluorine or chlorine. Examples of preferred representatives of the compounds B' are hydroquinone, resorcinol, 1,4-dihydroxynaphthalene, 4,4'-dihydroxydiphenyl, the compounds known as bisphenol A and F, 4,4'-difluorobenzophenone and 4,4'-dichlorobenzophenone, and 4,4'-dihydroxydiphenyl ether, the latter being particularly preferred.

Polyarylene ethers whose linear molecule segments are composed solely of units of the structure A are formed, for example, by polycondensation of monomers A' wherein one group X is a halogen atom and the other a hydroxyl group. Similarly, two different monomers A' may be used wherein one X represents halogen and the other X represents OH.

Preferably, mixtures of monomers A' and B' are used wherein the reactive groups X of one of the monomers, preferably A', are halogen atoms and those of the other monomer, preferably B', are hydroxyl groups.

Suitable for use as branched monomers B' and C' are the compounds (1) to (5), for example.

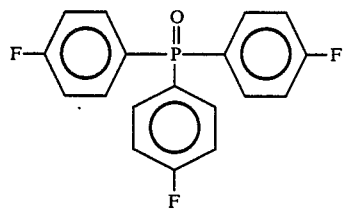

Tris(4-fluorophenyl)phosphine oxide (1)

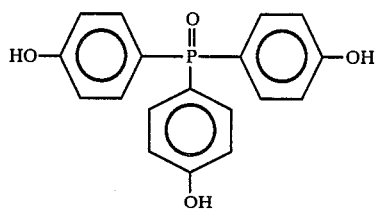

Tris(4-hydroxyphenyl)phosphine oxide (2)

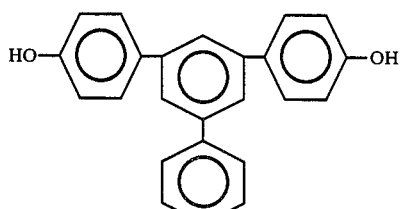

1,3,5-Tris(4'-hydroxyphenyl)benzene (3)

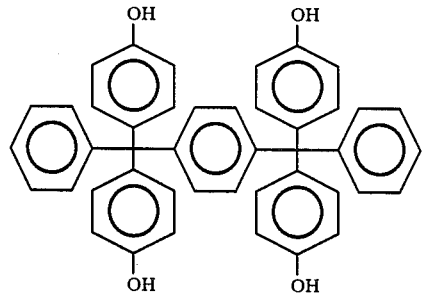

1,4-Bis-(4',4''-dihydroxytriphenylmethyl)benzene (4)

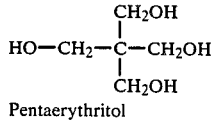

Pentaerythritol (5)

The end groups may be unreacted halogen atoms, such as F or Cl, or hydroxyl groups. To improve the stability of the polymer, the hydroxyl groups are preferably etherified with alkylating or arylating agents, such as methyl chloride, or the hydroxyl groups are acylated with acetic anhydride, for example.

Particularly economical is the polycondensation of a technical mixture of halogen triphenylphosphine oxides which contains, in addition to dihalogen triphenylphosphine oxide as the principal constituent, smaller amounts of mono- and trihalogen triphenylphosphine oxides, with an aromatic bisphenol, and particularly dihydroxydiphenyl ether. Said technical mixture contains monomers of the types A', C', and E—X.

A better unerstanding of the present invention and of its many advantages will be had by referring to the following specific Examples, given by way of illustration. The reduced viscosity of the products forming cast flexible foils according to the present invention was found to be markedly above 0.25 dl/g.

EXAMPLE 1

0.05 mole of bis(chlorophenyl)phenylphosphine oxide (synthesized by a Friedel-Crafts reaction, approximately 95 percent p-isomer), 0.053 mole of potassium carbonate, 0.0498 mole of 4,4'-dihydroxydiphenyl ether, 75 ml of N-methylpyrrolidone, 46 ml of chlorobenzene, and 0.0002 mole of 1,4-bis(4',4''-dihydroxytriphenylmethyl)benzene were mixed in a 250 ml four necked flask equipped with a stirrer, dropping funnel, internal thermometer, and Liebig condenser (which later can be replaced with a reflux condenser). The mixture was heated to boiling and a water/chlorobenzene mixture was distilled off. When practically nothing more came over, another 46 ml of chlorobenzene were slowly added dropwise at boiling temperature and more water/chlorobenzene was distilled off. Then the temperature of the reaction mixture was raised to 180° C. and the mixture was stirred for 20 hours at that temperature. Chloromethane was then introduced for 15 minutes into the reaction mixture. The latter was then cooled, diluted with 20 ml N-methylpyrrolidone, and filtered through a nutsch filter.

The reaction mixture was then introduced dropwise into 1.8 liters of water/methanol (volume ratio, 7:3) and the precipitated polymer was filtered off, washed with 100 ml of methanol, dried at room temperature for 18 hours, dissolved in methylene chloride, and again precipitated in methanol. The flocculent product filtered off (18.2 g) was washed with some methanol and dried at 80° C. in a vacuum to constant weight. From chloroform, a yellow, flexible, very stable cast foil was recovered.

When the same example was run without the use of 1,4-bis(4',4''-dihydroxytriphenylmethyl)benzene, but with exactly 0.05 mole of 4,4'-dihydroxydiphenyl ether, 16 g of polycondensate were obtained. From chloroform, a very brittle yellow, clear cast foil was recovered. When an attempt was made to separate it from the substrate after evaporation of the solvent, it disintegrated. With branching monomer $\eta_{spec/c}$ was determined to be 0.5, without branching monomer $\eta_{spec/c}$ was found to be 0.3 (in chloroform).

EXAMPLE 2

The reaction of 0.05 mole of 4,4'-dihydroxydiphenyl ether was carried out under the conditions described in Example 1. In place of 4,4'-dichlorotriphenylphosphine oxide, a 4,4'-difluorotriphenylphosphine oxide which contained 10 mole percent of 4-fluorotriphenylphosphine oxide was used. As a polyfunction reagent, 4,4',4''-trifluorotriphenylphosphine oxide (10 mole percent, based on the total amount of di- and monofluorotriphenylphosphine oxides) was used. The reaction was stopped after just 3½ hours. After working up, 16.5 g of soluble polyether were obtained. From chloroform, it yielded a clear, yellowish, flexible cast foil. With branching monomer $\eta_{spec/c}$ was determined to be 0.6 (in chloroform).

EXAMPLE 3

The reaction of 0.05 mole of 4,4'-dihydroxydiphenyl ether was carried out as described in Example 1, except that 4,4'-difluorotriphenylphosphine oxide was used in place of 4,4'-dichlorotriphenylphosphine oxide. For 3 mole percent of that difluorotriphenylphosphine oxide, 4,4',4''-trifluorotriphenylphosphine oxide was substituted.

The reaction of 180° C. was stopped 5 hours after completion of elimination of the water/chlorobenzene by distillation and the mixture was worked up as described in Example 1. 17.3 g of the desired polycondensate were obtained. From chloroform, it yielded a clear, yellowish cast foil that was flexible and tough.

In a comparative example, the reaction described was repeated, except that only the equivalent amount of 4,4'-difluorotriphenylphosphine oxide was used. The polycondensate obtained yielded only brittle cast foils from chloroform.

Further polyarylene ethers can be produced in accordance with example 1. The respective starting materials (including branching monomers) plus data of the polycondensation products are given in the following TABLE.

TABLE

| Example No. | Starting materials A' | B' | Branching monomers | $\eta$spec/c |
|---|---|---|---|---|
| 4 | CH$_3$P(O)(—⌬—F)$_2$ | HO—⌬—⌬—OH | 1,3,5-Hexantriol (2 mol %) | 0.7 |
| comparison | CH$_3$P(O)(—⌬—F)$_2$ | HO—⌬—⌬—OH | — | 0.5 |
| 5 | CH$_3$P(O)(—⌬—F)$_2$ | HO—⌬—|—⌬—OH | branching monomer (3) (2 mol %) | 0.8 |
| comparison | CH$_3$P(O)(—⌬—F)$_2$ | HO—⌬—|—⌬—OH | — | 0.6 |
| 6 | ⌬—P(O)(—⌬—F)$_2$ | bisphenol (4) | branching monomer (4) | 0.7 |
| comparison | ⌬—P(O)(—⌬—F)$_2$ | bisphenol (4) | — | 0.6 |
| 7 | ⌬P(O)(—⌬—Cl)$_2$ (ca. 3% meta-isomer) | HO—⌬—O—⌬—OH | sovermol 650 NS ®[1] (weight ratio of bisphenol present to sovermol = 9.91:0.53) | 0.5 |
| comparison | ⌬—P(O)(—⌬—Cl)$_2$ (ca. 3% meta-isomer) | HO—⌬—O—⌬—OH | — | 0.3 |
| 8 | ⌬—P(O)(—⌬—Cl)$_2$ (ca. 3% meta-isomer) | HO—⌬—O—⌬—OH | VP-LA 977[2] (weight ratio of bisphenol: VP-LA 977 = 9.91:1) | 0.5 |

[1]technical grade aliphatic alcohol with 3 OH-groups, molecular weight ca. 600; product supplied by Henkel KG, Dusseldorf, Germany.
[2]technical grade aliphatic alcohol with 3 OH-groups, molecular weight ca. 800; product supplied by Henkel KG.

Additional examples exemplifying the joint use of mono- and polyfunctional compounds are given in the following. Their production is performed in accordance with example 1.

| Example | Starting materials A' | B' | monofunctional compound | branching monomer | reaction time [h] | ηsp/c (Chloroform) |
|---|---|---|---|---|---|---|
| | | | 3 mol % | 3 mol % | | |
| 9 | | | | | 20 | 0.6 |
| comparison | " | " | " | — | 20 | 0.1 |

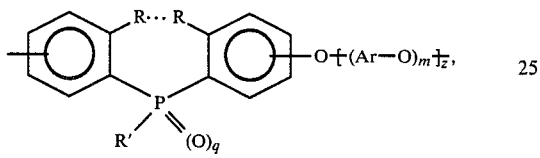

What is claimed is:

1. A phosphorus-containing polyarylene ether having repeating units of the structure

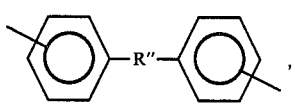

wherein
R taken alone is hydrogen or R ... R taken together are one of the groups R'';
R' is alkyl, chloroformethyl, or aryl;
Ar is phenylene, naphthylene, or

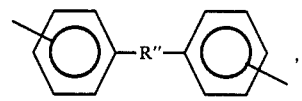

wherein
R'' is a covalent sngle bond, oxygen, sulfur, a sulfonyl, carbonyl, methylene, or isopropylidene bridge, or an organic groups having from 5 to 15 carbon atoms whose free valences emanate from quaternary carbon atoms;
q is 0 or 1;
m has an average value from 1 to 10; and
z is 0 or 1,
said ether further being branched and containing as branching points units of the structures

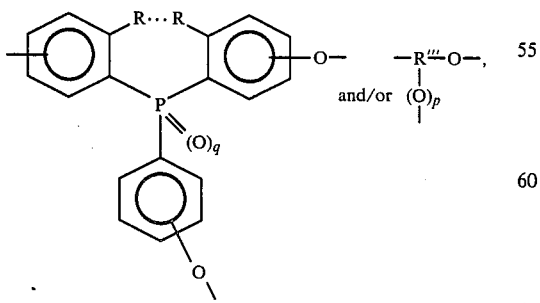

which statistically alternate with said repeating units, R''' being an at least trivalent aliphatic or aromatic group, q being 0 or 1, and p being an integer from 1 to 4.

2. A phosphorus-containing polyarylene ether as in claim 1 having a reduced viscosity of at least 0.25 dl/g.

3. A phosphorus-containing polyarylene ether as in claim 1 wherein said repeating units combined are from 90 to 99.5 mole percent, and the branching units combined are from 10 to 0.5 mole percent, of the sum of the moles of all units.

4. A phosphorus-containing polyarylene ether as in claim 1 wherein R is H and q is 1.

5. A phosphorus-containing polyarylene ether as in claim 1 wherein Ar is phenylene and m has a value from 1 to 10.

6. A phosphorus-containing polyarylene ether as in claim 1 wherein Ar is

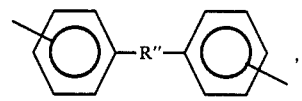

m is 1, and R'' is a single bond or isopropylidene.

7. A method for making a phosphorus-containing polyarylene ether which comprises polycondensing a bifunctional compound which is a phosphine or phosphine oxide of the formula

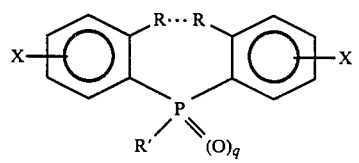

in the presence of 0.5 to 15 mole percent, of the number of moles of said bifunctional compound, of a polyfunctional compound which is a member selected from the group consisting of

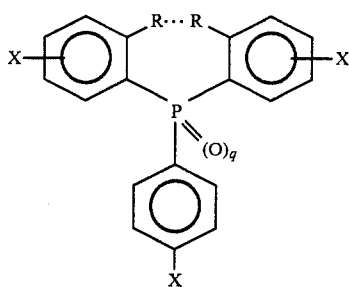

and

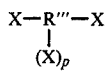

wherein
R taken alone is hydrogen or R...R taken together are a covalent single bond, oxygen, sulfur, sulfonyl, carbonyl, methylene, isopropylidene, or an organic group having 5 to 15 carbon atoms whose free valences emanate from a quaternary carbon atom;
R' is alkyl, chloromethyl, or aryl;
X is halogen or hydroxy;
q is 0 or 1;
R''' is an at least trivalent aliphatic or aromatic group; and
P is an integer from 1 to 4;
said polycondensation proceeding at an elevated temperature and in the presence of an amount of alkali at least half-equivalent to the groups X, one-half of all X present in the system being halogen and the other half hydroxy.

8. A method as in claim 7 which comprises effecting said polycondensation in the further presence of of a monofunctional compound of the formula

E—X wherein
E is alkyl, aryl, or triphenylphosphine oxide, and
X is halogen or hydroxy,
one-half of all X present in the system being halogen and the other half hydroxy.

9. A method as in claim 7 which comprises effecting said polycondensation in the further presence of a further bifunctional compound of the formula X—(Ar—O)$_{m-1}$—Ar—X wherein
X is halogen or hydroxy;
m has an average value from 1 to 10;
Ar is phenylene, naphthylene, or

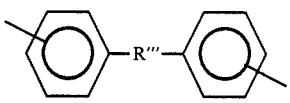

wherein
R'' is a covalent single bond, oxygen, sulfur, sulfonyl, carbonyl, methylene, isopropylidene, or an organic group having 5 to 15 carbon atoms whose free valences emanate from a quaternary carbon atom;
one-half of all X present in the system being halogen and the other half hydroxy.

10. A method as in claim 9 which comprises effecting said polycondensation in the further presence of of a monofunctional compound of the formula

E—X wherein
E is alkyl, aryl, or triphenylphosphine oxide and
X is halogen or hydroxy,
one-half of all X present in the system being halogen and the other half hydroxy.

11. A method as in claim 7 wherein said bifunctional compounds are from 90 to 99.5 mole percent of the total number of moles of said bifunctional and polyfunctional compounds.

12. A method as in claim 9 wherein said bifunctiional compounds are from 90 to 99.5 mole percent of the total number of moles of said bifunctional and polyfunctional compounds.

13. A method as in claim 8 wherein said bifunctional compounds are from 90 to 99.5 mole percent of the total number of moles of said bifunctional, polyfunctional, and monofunctional compounds.

14. A method as in claim 10 wherein said bifunctional compounds are from 90 to 99.5 mole percent of the total number of moles of said bifunctional, polyfunctional, and monofunctional compounds.

15. A method as in claim 7 wherein said polyfunctional compounds are at most 5 mole percent of the reagents.

16. A method as in claim 9 wherein said polyfunctional compounds are at most 5 mole percent of the reagents.

* * * * *

UNITED STATES PATENT AND TRADEMARK OFFICE
CERTIFICATE OF CORRECTION

PATENT NO. : 4,745,225

DATED : May 17, 1988

INVENTOR(S) : Ude et al.

It is certified that error appears in the above-identified patent and that said Letters Patent is hereby corrected as shown below:

```
Column 2, line 25, replace " R" " by -- R''' --.

Column 5, line 13, replace "B+" by -- B' --;

Column 8, line 15, replace "unerstanding" by -- understanding --

Column 11, line 33, replace "chloroformethyl" by
                              --chloromethyl--;

line 42, replace "sngle" by -- single --.

Column 13, line 38, cancel a redundant occurrence of "of".

Column 14,  lines 6-11, in the formula in these lines,
            replace " R''' " by -- R" --;

line 20, cancel a redundant occurrence of "of";

Line 34, replace "bifunctiional" by
                    -- bifunctional --.
```

Signed and Sealed this

Fourteenth Day of February, 1989

*Attest:*

DONALD J. QUIGG

*Attesting Officer*    *Commissioner of Patents and Trademarks*